United States Patent [19]
Garden

[11] Patent Number: 4,712,712

[45] Date of Patent: Dec. 15, 1987

[54] BALL DISPENSING APPARATUS AND METHOD

[76] Inventor: Robert L. Garden, 1525 W. Cornstock, Chandler, Ariz. 85224

[21] Appl. No.: 888,030

[22] Filed: Jul. 18, 1986

[51] Int. Cl.[4] .................. G01F 9/00

[52] U.S. Cl. .................. 221/68; 221/93; 221/266; 221/151; 221/154; 221/236; 221/195; 221/281

[58] Field of Search .................. 221/93, 123, 133, 151, 221/152, 153, 154, 155, 194–196, 265, 266, 281, 287, 236, 68; 273/201, 32 D, 29 A; 312/45, 49

[56] References Cited

U.S. PATENT DOCUMENTS

| | | | |
|---|---|---|---|
| 1,004,094 | 9/1911 | Sigley | 221/266 |
| 1,113,476 | 10/1914 | Osmer | 221/194 |
| 2,138,232 | 11/1938 | Giannini | 221/266 |
| 2,193,211 | 3/1940 | Taylor | 221/155 |
| 2,252,493 | 8/1941 | Dennis | 221/281 |
| 2,479,878 | 8/1949 | Strelzoff | 221/266 |
| 3,066,827 | 12/1962 | Pryor | 221/281 |
| 4,588,108 | 5/1986 | Knez et al. | 221/93 |

*Primary Examiner*—H. Grant Skaggs
*Attorney, Agent, or Firm*—Harry M. Weiss & Associates

[57] ABSTRACT

An apparatus and a method for simultaneously dispensing a plurality of golf balls are disclosed. A housing member having a plurality of guide members therein is provided for guiding the plurality of balls therethrough into a holding member suitable for being operably connected to a conventional coin dispenser. The manually operated, coin activated, dispenser is operated to allow the plurality of balls to be dispensed into a basket-like member for easy access to a user or player.

6 Claims, 6 Drawing Figures

BALL DISPENSING APPARATUS AND METHOD

BACKGROUND OF THE INVENTION

This invention relates generally to an apparatus and a method for dispensing a plurality of balls; such as, golf, tennis, racquet balls or the like, which can be readily installed proximate a playing field or court. More particularly, the invention relates to a dispensing apparatus and method for storing a plurality of balls which when desired can be dispensed from a storage compartment housing for storing said plurality of balls. The ball dispensing apparatus and method of the present invention is suitable for being operably coupled to a conventional coin box dispenser in order to permit the plurality of balls to be dispensed and made available to a player or user when desired.

At present, many playing fields are void of means for providing immediate access to the balls. In the game of golf, for example, players often practice in golf driving ranges wherein a plurality of golf balls are required to take full advantage of the benefits of the driving ranges. In most instances, shops are set up near the driving ranges or playing fields wherein a shop attendent provides the players with the required balls. In such a set up, it is obvious that the time and cost expended in providing the manpower to provide the players with access to the game balls are significant and an inefficient use of manpower.

Golf ball dispensing apparatuses which are presently available tend to be heavy and electrically-operated thereby ineffective in terms of having them transported in different locations of the playing fields or courts. Also, other golf dispensing devices tend to tangle the balls therein thereby significantly affecting the effectivity of such devices.

Accordingly, there is a substantial need for a ball dispensing apparatus and method suitable for overcoming the above-discussed problems of the presently available devices. Moreover, the ball dispensing apparatus should be lightweight and not requiring electrical power in order for it to be made easily installed anywhere in the playing field or court. Due to the need in locating the golf ball dispensing apparatuses outdoors, it is also essential that it be non-corrosive. Further, it is essential that the ball dispensing apparatus be constructed in a manner as to allow rapid unloading to provide maximum service to players' immediate needs.

SUMMARY OF THE INVENTION

It is an object of this invention to provide a ball dispenser apparatus which is lightweight and non-electrically operated to permit easy installation in various locations of a playing field or court, preferably easily accessible to the ball players.

It is another object of this invention to provide a ball dispenser apparatus which is made substantially of non-corrosive material for allowing said dispenser apparatus to be located outdoors.

It is still another object of this invention to provide a ball dispenser apparatus suitable of providing rapid unloading of the balls in order to provide maximum service to the ball players' immediate needs.

It it a further object of this invention to provide a ball dispenser apparatus having the capacity to rapidly and efficiently discharge the plurality of balls stored therein when not in use.

It is still a further object of this invention to provide a ball dispenser apparatus which will be light in weight, sufficiently sturdy when in use, durable in construction, inexpensive and easy to manufacture.

In accordance with one embodiment of the present invention, a ball dispenser apparatus suitable for being readily and efficiently made available to golfers, racquet ball players, tennis players or the like is disclosed. More particularly, a housing member has a plurality of angularly aligned sets of side members housed therein suitable for guiding a plurality of balls, such as golf, racket, or tennis balls, or the like. The guide members permit the plurality of balls to be guided preferably from the upper portion of the housing member to an opening preferably located at the lower portion of said housing member; thus capable of taking advantage of the usefulness of gravity. Moreover, the angularly aligned set of guide members are positioned in such a manner as to suitably provide appropriate speeds for the downwardly moving balls through said sets of guide members.

Moreover, the housing member has an upper cover suitable for allowing a safety flap member to be raised when said upper cover is in use for permitting the plurality of balls to pass through underneath said flap member. When the upper cover is removed, the safety flap member blocks off the plurality of balls from passing through the lower portion of the housing member. Also, a coin dispenser apparatus is suitable for being operably attached to the housing member to permit a user to have the balls to pass through the opening to have easy access thereof.

The foregoing and other objects, features and advantages of this invention will be apparent from the following, more particular, description of the preferred embodiments of this invention as illustrated in the accompanying drawings.

BRIEF DESCRIPTION OF THE DRAWINGS

FIG. 3A is a cross-sectional view taken along line 3—3 of FIG. 4 showing the manner in which a generally semi-cylindrical holder member initially holds a plurality of balls proximate an opening preferably at a lower portion of said ball dispenser while

DESCRIPTION OF THE PREFERRED EMBODIMENT

Figure 1:
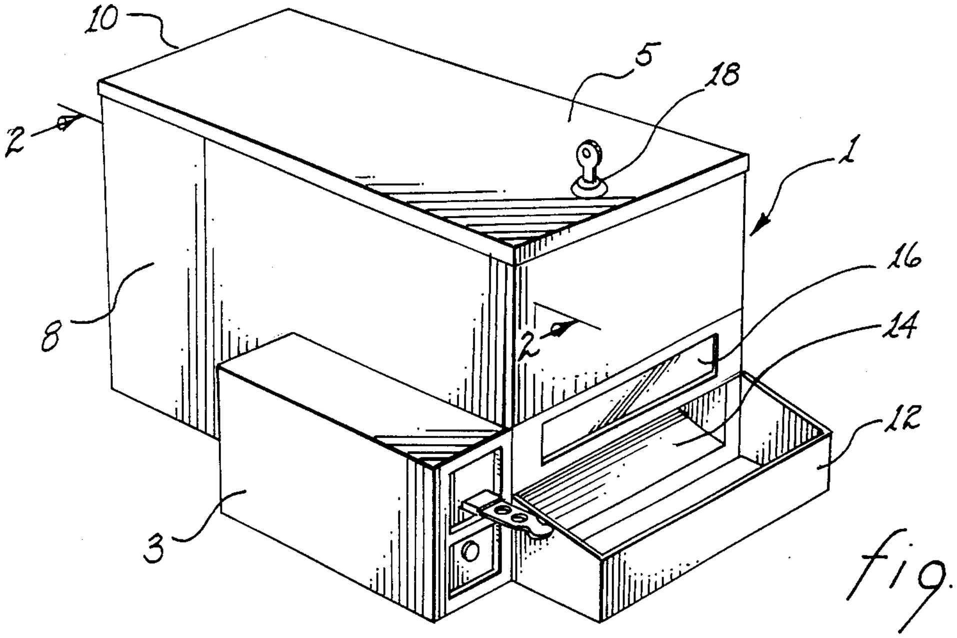
FIG. 1 is a perspective view of one embodiment of a ball dispenser with an associated conventional coin dispenser operably attached thereto.

FIG. 1 illustrates a perspective view of the ball dispenser, generally referred to by reference number 1, with a conventional coin dispenser 3 which is operably attached to the ball dispenser 1 in a manner which will be discussed infra. As shown in FIG. 1, a cover member 5 located thereabove a housing member 8 of the ball dispenser 1 is preferably swingably connected by a preferably elongated hinged member 10 (see also FIG. 2, infra). Preferably on the front portion of the housing member 8 is a basket-like member 12 at the lower portion thereof for catching the plurality of balls which is dispensed through an opening 14. In order to allow a user to see the balls which will be immediately available for his use, a transparent member 16 thereabove the opening 14 is coupled thereto. Preferably, a conventional lock and key member combination 18 (see also FIG. 2 infra) is located thereabove the cover member 5 to lock the plurality of balls inside the housing member 8.

Figure 2:
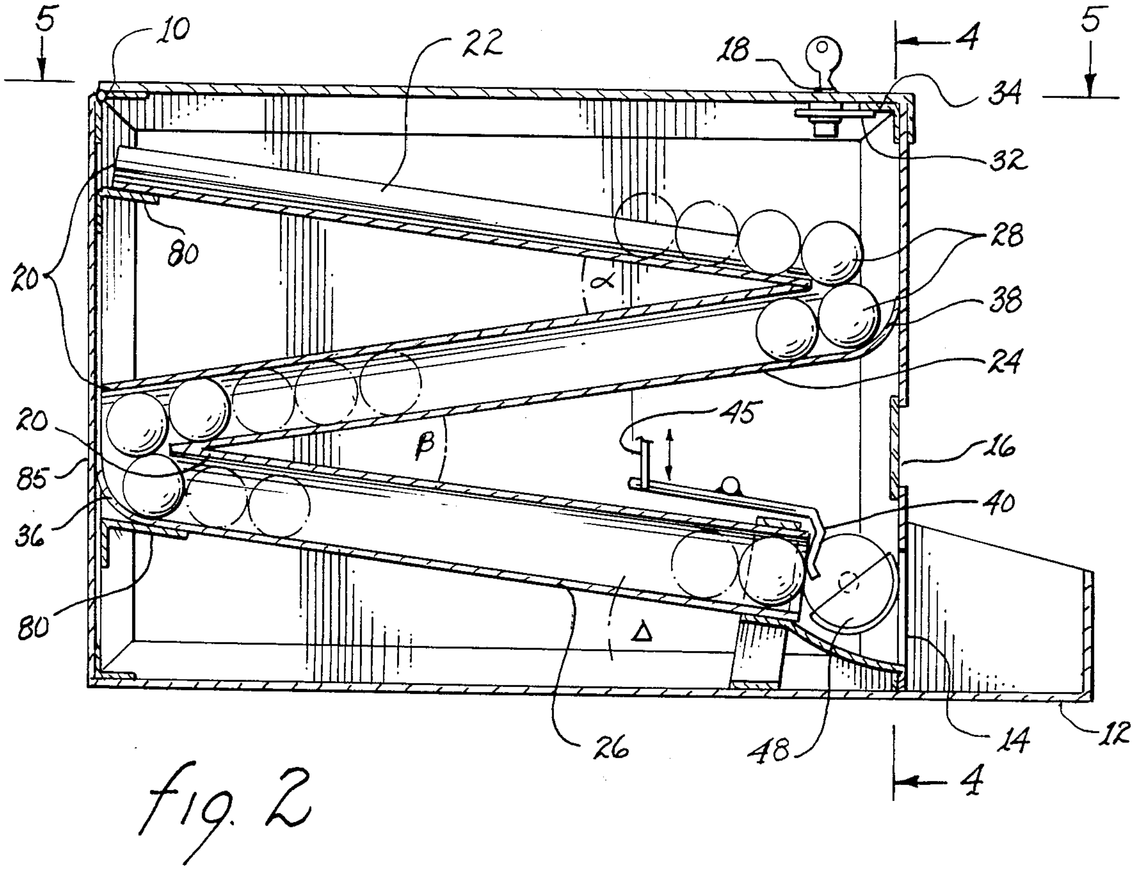
FIG. 2 is a cross-sectional view taken along line 2—2 of FIG. 1 showing the manner in which a plurality of ball guide members are angularly aligned inside said ball dispenser.

As illustrated in FIG. 2, inside the housing member 8 is a plurality of guide members 20 wherein the upper guide members 22 are preferably and substantially semi-cylindrical. The intermediate guide members 24 are preferably cylindrical and also the lower guide members 26 are preferably cylindrical. The plurality of guide members 20 are suitable for efficiently guiding a plurality of balls 28 travelling from the upper guide members 22 through the intermediate guide members 24 to the lower guide members 26 with the aid of gravity. As further shown in FIG. 2, in order to achieve the most efficient travel of the plurality of balls 28, the upper 22, intermediate 24 and lower 26 guide members are angled preferably at $\alpha=4\pm1$, $\beta=5\pm1$ and $\Delta=3\pm1$, respectively. In such positions, the guide members 20 allow the balls 28 to travel at an acceptable and efficient speed to preclude any jamming of said balls 28 during their travels through said guide members 20.

As further shown in FIG. 2, the lock and key member combination 18 has a latch member 32 suitable for swinging therebelow a flange member 34 integral to the front portion of the housing member 8 for locking and unlocking the cover member 5. Integrally attached to the inner surface of the back portion of the housing member 8 is a back guide flange member 36 to permit a smooth transition therebetween the intermediate 24 and lower 26 guide members. Similarly, a front guide flange 38 therebetween the upper 22 and intermediate 24 guide members is either integrally coupled to the inner surface of the front portion of the housing member 8 or the intermediate guide members 24.

Although, upper 22, intermediate 24 and lower 26 guide members are shown in one embodiment of this invention, a plurality of layers of guide members 20 beyond the number of that shown in FIG. 2 may be used with a larger housing member 8 in order to accommodate therein a larger number of balls 28.

When installing the plurality of balls 28 onto the upper guide members 22, a safety flap member 40 is operably connected to an upwardly extending member 45 which upwardly extends beyond the side portion of the housing member 8 when the cover member 5 is not in use or in place thereabove said housing member 8. When the cover member 5 is used or closed, the upper tip of the upwardly extending member 45 contacts the cover member 5 and pushed downward to allow the safety flap member 40 to be lowered; thereafter, closing off the lower guide members 26 and blocking off any passages of balls 28 therethrough.

At the end of the lower guide member 26 immediately after the balls 28 leave said lower guide member 26 is a generally semi-cylindrical holder member 48 suitable for swinging in a manner suitable for accommodating the plurality of balls 28 and thereafter dispensing said balls 28 through the opening 14 onto the basket-like member 12 upon the triggering of a lever 50 (see FIG. 4 infra) operably connected therebetween the generally semi-cylindrical holder member 48 and the coin dispenser 3, as will later be discussed.

Figure 3A:
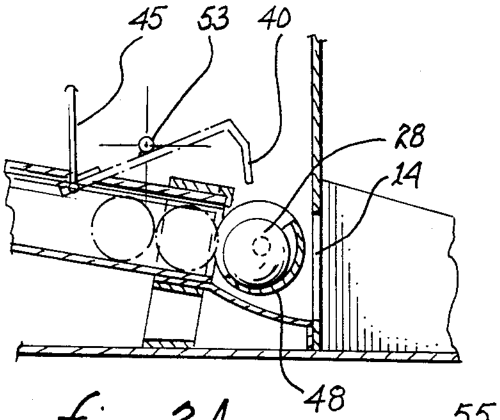

In FIG. 3A, the open end of the holder member 48 is shown to be rotated or swung backwards towards the lower guide members 26 for accommodating the balls 28 therein. Similarly, the safety flap member 40 is swung upwards due to the upwardly extending member 45 being pushed downward by the cover member 5 (see further discussion supra). In order to allow the safety flap member 40 to be appropriately swung, as discussed supra, a preferably elongated hinged member 53 therealong the upper portion of the safety flap member 40 is connected thereto. The ends of the elongated hinged member 53 are attached to internal frames 55 within the housing member 8 (see FIG. 4 infra).

Figure 3B:
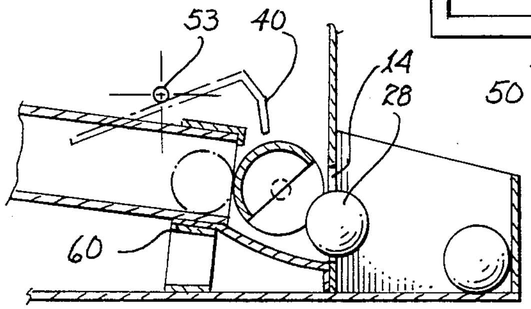
FIG. 3B is a cross-sectional view also taken along line 3—3 of FIG. 4 showing the manner in which the semi-cylindrical holder member dispenses the plurality of balls through said opening of the ball dispenser.

In FIG. 3B, when the coin dispenser 3 is in use, the open end of the semi-cylindrical holder member 48, having accommodated the balls 28 therein, is swung forwards thereby dispensing the balls 28 through the opening 14 and into the basket-like member 12 for easy access by a user. In order to provide rigidity and stability to the end portion of the lower guide members 26, a brace member 60 suitable for securing the upper and lower portions of the end portions of said lower guide members 26 is attached thereto.

Figure 4:
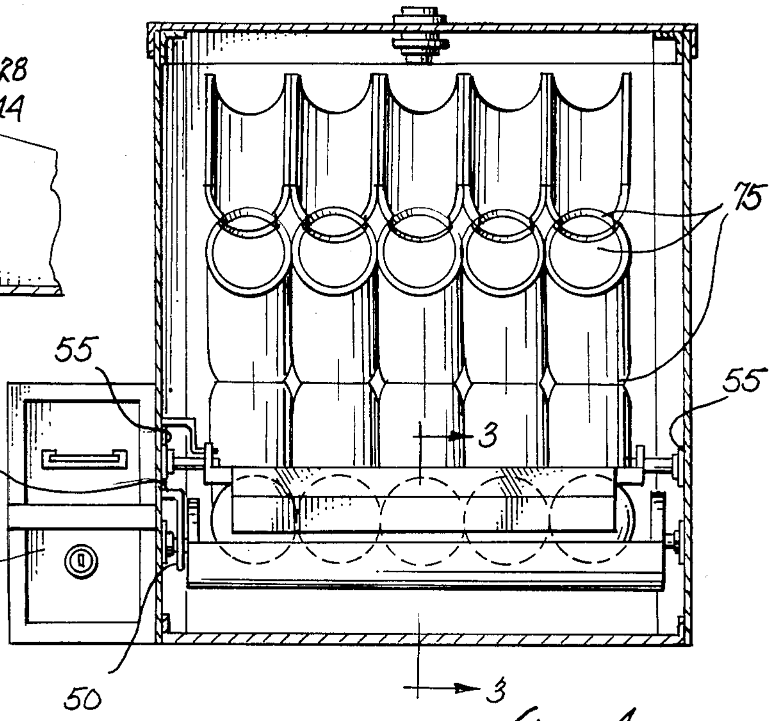
FIG. 4 is a cross-sectional view taken along line 4—4 of FIG. 2 showing the manner in which the safety flap member blocks off the plurality of balls.

As illustrated in FIG. 4, the lever 50 is operably attached to the holder member 48. The lever 50 has a first member (not shown) preferably extending from the side of the holder member 48 and a second member (not shown) extending from the outward end of the first member. The second member preferably has an elongated aperture passing therethrough for operably accommodating therein a third member 71 for operably connecting to the in dispenser 3. As also shown in FIG. 4, the transitional ends 75 therebetween the guide members 22, 24, 26 are open (i.e., no guide member sides therebetween) to allow the balls 28 to descent from one guide member to another. As better illustrated in FIG. 3 supra, the guide members 22, 24, 26 are held within the inside frame 55 by brace members 80 extending therefrom said inside frame 55. As also illustrated in FIG. 2 supra, a back flap member 85 having member 36 attached thereto may be rotatably moved away from the housing member 8 to permit the balls 28 from the upper 22 and intermediate 24 guide members to be unloaded therefrom when not in use.

Figure 5:
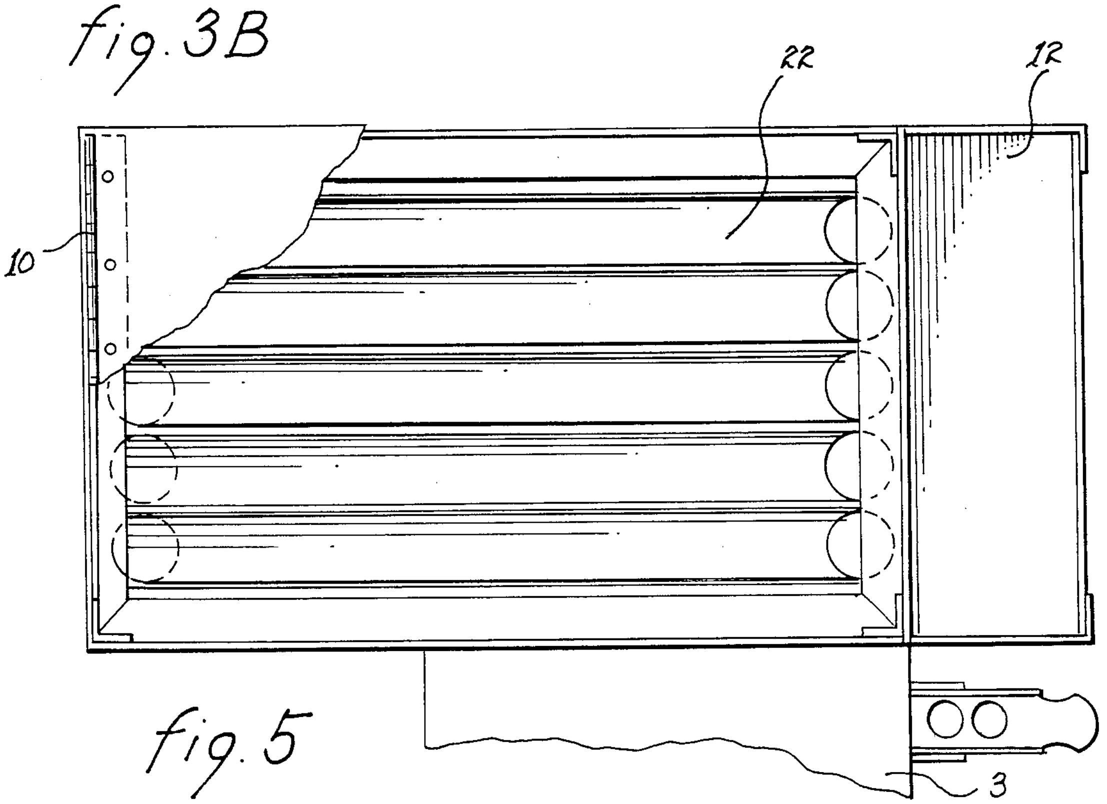
FIG. 5 is a top elevational view of the ball dispenser showing the manner in which the ball guide members are aligned side by side immediately below the removable upper cover.

As shown in FIG. 5, a top elevational view, with the cover member 5 not in place, of the ball dispenser 1 is shown illustrating the manner in which the guide member 22 are aligned side by sides.

Various parts of the ball dispenser 1, as described, are preferably made of material which will be light in weight, sufficiently rigid when in use, durable in construction, non-corrosive, inexpensive and easy to manufacture; such as aluminum, stainless steel, plastic or the like or any combination thereof.

While the invention has been particularly shown and described in reference to preferred embodiments thereof, it will be understood by those skilled in the art that changes in form and details may be made therein without departing from the spirit and scope of the invention.

I claim:

1. A manually operated golf ball dispenser apparatus for simultaneously dispensing a plurality of golf balls, comprising:

a housing member means for housing a plurality of golf balls therein;

a plurality of angularly aligned guide means each arranged in a continuous zig-zag manner for guiding one of said plurality of golf balls out of said housing member means, each of said plurality of guide means having a plurality of golf ball guide members;

a safety flap member means located therebelow said guide member means for blocking off said golf balls when said ball dispenser apparatus is not in use;

a removable cover member means thereabove said housing member means operably attached to said safety flap member means to cause said flap member means to unblock the golf balls on said guide members in response to the action of the cover member means being placed in its closed position;

a holding member means located proximately adjacent the lower end of said guide member means rotatably coupled to an inner frame of said housing member means for holding a number of said plurality of golf balls; and a manually operated, coin activated dispenser means for operably coupling to said holding member means for simultaneously dispensing said plurality of golf balls that are accumulated from each one of said plurality of guide means.

2. The manually operated golf ball dispenser apparatus for simultaneously dispensing a plurality of golf balls as in claim 1 wherein said housing member means comprises:

a transparent member means adjacent said holding member means for allowing a user to see said number of said plurality of balls to be dispensed therefrom;

an opening means therebelow said housing member means for passing said balls therethrough; and a basket-like member means for catching said balls which are dispensed through said opening means.

3. The manually operated golf ball dispenser apparatus for simultaneously dispensing a plurality of golf balls as in claim 2 wherein said cover member means has a lock and key member combination means operably coupled thereto for locking said cover member means onto said housing member means.

4. The manually operated golf ball dispenser apparatus for simultaneously dispensing a plurality of golf balls as in claim 1 further comprising a back flap member means for allowing said plurality of balls to be discharged therefrom said housing member means when said ball dispenser apparatus is not in use.

5. A method of manually and simultaneously dispensing a plurality of golf balls from a housing member means, comprising the steps of:

loading a plurality of golf balls into a plurality of angularly aligned guide means each arranged in a continuous zig-zag manner inside said housing member means, each of said guide means having a plurality of golf ball guide members;

blocking the golf balls on the guide members at a position lower most on the guide means;

closing a cover member means thereabove said housing member means and in response thereto, unblocking the golf balls on said guide members;

dispensing a plurality of golf balls into a holding member means proximately located adjacent an opening means of said housing member means;

inserting at least one coin into a manually operated, coin activated, dispenser means operably coupled to said housing member means;

operating said coin dispenser means;

operating said holding member means;

simultaneously dispensing said plurality of golf balls that are accumulated from each one of said plurality of guide members into a basket-like member for easy access of said balls to a user; and thereafter guiding said plurality of balls therethrough a plurality of guide member means toward said holding member means.

6. The method of manually and simultaneously dispensing a plurality of golf balls as in claim 5 further comprising the steps of:

opening a back flap member means; and thereafter releasing said plurality of balls therefrom said housing member means.

* * * * *